No. 633,325. Patented Sept. 19, 1899.
C. LUKE.
PIPE COUPLING DEVICE.
(Application filed Apr. 20, 1899.)
(No Model.)
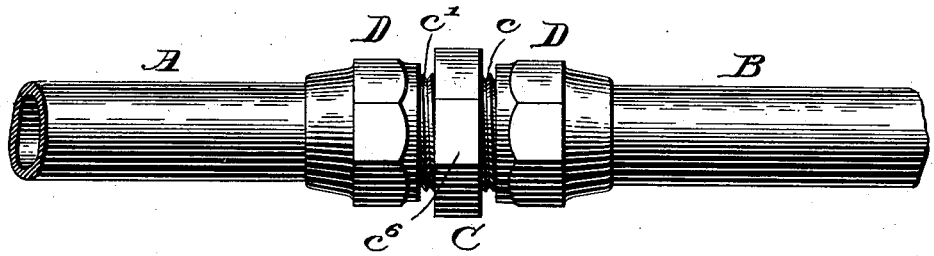
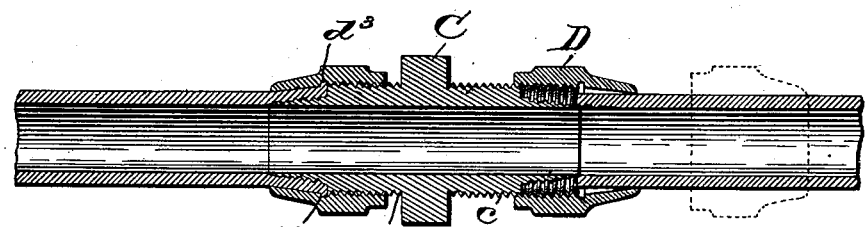
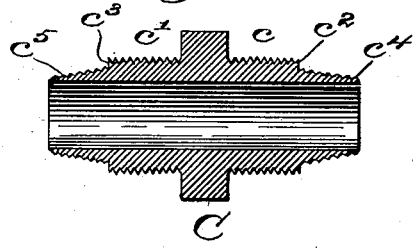
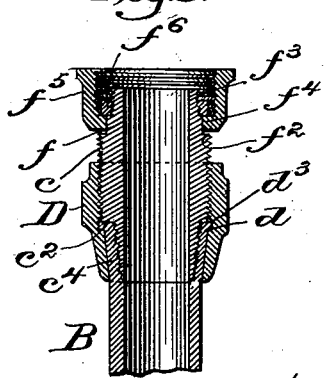
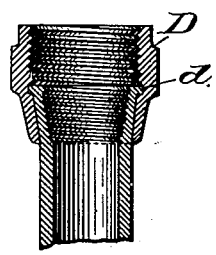
Witnesses:
Fred S. Greenleaf
Thomas J. Drummond
Inventor:
Charles Luke.
by Crosby Gregory.
Attys.

UNITED STATES PATENT OFFICE.

CHARLES LUKE, OF MILFORD, CONNECTICUT, ASSIGNOR, BY MESNE ASSIGNMENTS, TO THE NEW HAVEN NOVELTY MACHINE COMPANY, OF NEW HAVEN, CONNECTICUT.

PIPE-COUPLING DEVICE.

SPECIFICATION forming part of Letters Patent No. 633,325, dated September 19, 1899.

Application filed April 20, 1899. Serial No. 713,760. (No model.)

*To all whom it may concern:*

Be it known that I, CHARLES LUKE, of Milford, county of New Haven, State of Connecticut, have invented an Improvement in Pipe-Coupling Devices, of which the following description, in connection with the accompanying drawings, is a specification, like letters on the drawings representing like parts.

This invention has for its object to provide a coupling device for use with lead and similar ductile pipe which will readily adapt itself under compression into other shapes.

My novel coupling is adapted in one form in which I have chosen herein to illustrate it to joining the ends of lead pipe without solder, and by its use a gas-tight connection may be effected without making a solder or wiped joint, as now invariably done when uniting lead pipe, and in another form it is adapted to join the end of a lead pipe with, say, a gas-meter, washbowl, bath-tub, beer-fixtures, &c., where lead pipe is used.

My novel coupling presents a sleeve-like collar threaded internally at one end toward the middle of its length, the collar at the end of its thread being provided with an annular groove, and from said groove to the opposite end of the collar its interior is tapered, so that that end of the collar presents a smaller diameter. This collar is entered by a hollow plug having a threaded cylindrical portion adapted to engage the screw-threads of the collar, the threaded cylindrical part of the plug being terminated by an annular shoulder, and from said shoulder the hub is tapered and threaded, and the degree or inclination of the taper is substantially the same as that at the interior of the collar. In the use of the described coupling the collar may be slipped fully on the end of a lead pipe, and the end of the tapered part of the plug may be just entered at the open end of the pipe, and then the collar may be slid on the pipe until its threads meet the threads at the cylindrical part of the plug, when the plug will be turned to enter the collar, the tapered threaded end of the plug cutting its way into the pipe and acting, with the tapered surface of the collar, to hold and clamp the pipe to the collar, and during this operation the shoulder of the plug will act on the end of the pipe being expanded by the plug and will turn said end over, causing the pipe to enter the annular groove of the collar and present there an annular flange filling said groove.

Figure 1 shows two pieces of lead pipe united by one form of coupling embodying my invention. Fig. 2 is a longitudinal section of Fig. 1 with the exception that the collar at the right occupies a different position, the figure showing by dotted lines a collar occupying a position on the pipe preparatory to its arrival in the position shown at the right of said figure by full lines. Fig. 3 shows a collar with a piece of pipe flanged in its annular groove. Fig. 4 shows the plug detached; and Fig. 5 shows a modification, to be described.

A and B represent two pieces of lead pipe to be joined quickly without the use of solder. To do this, I employ a plug C, shown as having two cylindrical portions $c$ $c'$ threaded, the end of each threaded portion being terminated, respectively, by an annular shoulder $c^2$ $c^3$, and beyond said shoulders, which are cut into the plug for a considerable distance in excess of the depth of said screw-threads, the ends $c^4$ $c^5$ of the plug, Figs. 1, 2, and 4, being tapered and threaded to a substantially thin edge. Coöperating with the cylindrical threaded portion $c$ $c'$ of the plug are collars D, provided each at one end with interior screw-threads to engage the threaded part $c$ $c'$ of the plug, and at the inner end of the threaded part of each collar is an annular groove $d$, and from said groove to its opposite end said collar decreases in diameter and is made to present a tapered interior, the degree of taper of the collar being substantially the same as that of the end of the plug. To unite the pipe and plug, I may slip a collar on the end of the pipe, as shown by dotted lines at the right in Fig. 2, and then put the end of the pipe in position against the end of the plug, so that the tapered part of the plug may enter the end of the pipe. I then slide the collar on the pipe, causing it to pass over the tapered part of the plug, and the collar arriving at the cylindrical threaded part of the plug the latter is turned so that it enters the threads of the collar, and as the plug so enters the collar the tapered threaded end of the plug started into the open end of the pipe cuts its way into the pipe and also quickly stretches or expands the same, causing it to fit the tapered interior of the collar, and finally the shoulder of the plug contacts with the end of the pipe and forces it into the groove $d$ of the collar, forming a flange $d^3$ on the pipe, which fills the groove of the collar, thus fixing the pipe in the collar. In making the joint white lead may be used, if desired; but the joint may be made gas-tight merely by pressure of the pipe between the tapered threaded end of the plug and the tapered interior of the collar.

Fig. 5 shows a modified form of my invention, it being adapted to connect a lead pipe with a threaded part of a gas-meter or other device or article. In this modification instead of employing a hollow plug threaded at each end of the wrench-receiving portion $c^6$ I employ but one threaded and tapered end, and I provide one end of the plug with a plain part $f$, separated from the cylindrical threaded part $c$ by a shoulder $f^2$, and the extremity of the plug opposite its tapered threaded end is provided with a screw-thread $f^3$, which is terminated at a shoulder $f^4$. On this plain part $f$ I apply a running nut $f^5$, and I then apply to the threaded part $f^3$ a ring $f^6$ to keep the running nut in working position. This running nut may be turned onto any usual threaded projection of a meter or the fixture of a washbowl, bath-tub, sink, or beer outfit, and the ring $f^6$ may support a washer fitted tightly on the threaded end $f^3$ of the plug. The joint formed by the running nut $f^5$ with the under connection may be of usual kind.

In my invention the gasway in the pipe and the plug are of substantially the same diameter.

Having described my invention, what I claim as new, and desire to secure by Letters Patent, is—

1. A pipe-coupling composed of a hollow plug presenting at each end a threaded cylindrical portion terminated by a tapered threaded portion, the threads of such portions being of the same pitch and two collars threaded to engage the threaded cylindrical parts of the plug and tapered to correspond substantially with the taper of the plug.

2. A pipe-coupling composed of a hollow plug presenting a threaded cylindrical portion and a threaded tapered end, the cylindrical portion and the tapered portion being separated by an annular shoulder, and a collar threaded internally at one end, the collar having within it at the end of the screw-thread an annular groove, the collar being tapered internally from said groove toward its end and contracted in diameter.

3. A pipe-coupling composed of a hollow plug presenting a threaded cylindrical portion and a threaded tapered end, the cylindrical portion and the tapered portion being separated by an annular shoulder, and a collar threaded internally at one end, the collar having within it at the end of the screw-thread an annular groove, said groove presenting a shoulder having a face parallel with the annular shoulder of the plug.

4. A pipe-coupling composed of a hollow plug presenting at each end a threaded cylindrical portion terminated by a tapered threaded portion the threads of the cylindrical portion and the tapered portion being of substantially the same pitch, and two collars presenting threaded portions and tapered portions and also a shoulder and an annular groove between each threaded and tapered portion, the threaded portions engaging the threaded cylindrical portions of the plug, the tapered portions being substantially of the same length as the tapered threaded portions of the plug, whereby the pipe in which the threaded tapered portions are screwed are embraced by the collar substantially throughout the length of the threaded tapered portion.

In testimony whereof I have signed my name to this specification in the presence of two subscribing witnesses.

CHARLES LUKE.

Witnesses:
HENRY G. THOMPSON,
GEORGE E. HAIGHT.